(12) United States Patent
Sun et al.

(10) Patent No.: US 11,444,952 B2
(45) Date of Patent: Sep. 13, 2022

(54) SYNTHETIC IDENTIFICATION PROTOCOL APPARATUS AND METHOD

(71) Applicant: Springcoin, Inc., Chicago, IL (US)

(72) Inventors: John Sun, Northbrook, IL (US); Robert Krzyzanowski, Naperville, IL (US); Kirill Sevastyanenko, Chicago, IL (US)

(73) Assignee: SPRINGCOIN, INC., Marina Del Rey, CA (US)

( * ) Notice: Subject to any disclaimer, the term of this patent is extended or adjusted under 35 U.S.C. 154(b) by 181 days.

(21) Appl. No.: 16/380,533

(22) Filed: Apr. 10, 2019

(65) Prior Publication Data

US 2019/0342303 A1 Nov. 7, 2019

Related U.S. Application Data

(60) Provisional application No. 62/682,086, filed on Jun. 7, 2018, provisional application No. 62/676,217, filed on May 24, 2018, provisional application No. 62/666,598, filed on May 3, 2018.

(51) Int. Cl.
| | |
|---|---|
| *H04L 29/06* | (2006.01) |
| *H04L 9/40* | (2022.01) |
| *G06F 21/62* | (2013.01) |

(52) U.S. Cl.
CPC ........ *H04L 63/105* (2013.01); *G06F 21/6245* (2013.01); *H04L 63/08* (2013.01)

(58) Field of Classification Search
CPC ... H04L 2209/38; H04L 9/0637; H04L 63/08; H04L 63/105; G06F 21/60; G06F 21/62; G06F 21/6245
See application file for complete search history.

(56) References Cited

U.S. PATENT DOCUMENTS

| | | | | |
|---|---|---|---|---|
| 6,567,817 | B1 * | 5/2003 | VanLeer | G06F 12/0871 |
| 8,275,365 | B1 * | 9/2012 | Patvarczki | H04L 67/24 |
| | | | | 455/414.3 |
| 9,069,792 | B1 * | 6/2015 | Craighead | G06F 16/172 |
| 10,764,036 | B1 * | 9/2020 | Griffin | H04L 9/3247 |
| 2005/0138010 | A1 * | 6/2005 | Bernal | G06F 16/284 |
| 2009/0022149 | A1 * | 1/2009 | Rosenberg | H04M 7/0057 |
| | | | | 370/389 |
| 2011/0060905 | A1 * | 3/2011 | Stack | G06Q 30/02 |
| | | | | 713/167 |
| 2011/0112696 | A1 * | 5/2011 | Yodfat | G16H 40/63 |
| | | | | 700/283 |
| 2011/0276780 | A1 * | 11/2011 | Sengupta | G06F 12/0862 |
| | | | | 711/216 |

(Continued)

*Primary Examiner* — Richard A McCoy
(74) *Attorney, Agent, or Firm* — Fitch, Even, Tabin & Flannery LLP

(57) ABSTRACT

A control circuit receives personally identifiable information that corresponds to a particular entity. The control circuit uses that personally identifiable information to access a block chain ledger that serves as an identity block chain ledger. The control circuit then receives a synthetic identifier from the block chain ledger. This synthetic identifier correlates to the aforementioned personally identifiable information and also correlates to other data that corresponds to the particular entity and which other data is stored in a data storage element other than the block chain ledger.

20 Claims, 3 Drawing Sheets

(56) References Cited

U.S. PATENT DOCUMENTS

| | | | |
|---|---|---|---|
| 2012/0011512 A1* | 1/2012 | Peckham | G06F 9/44521 |
| | | | 718/100 |
| 2013/0138569 A1* | 5/2013 | Yan | G06Q 30/0261 |
| | | | 705/50 |
| 2013/0326080 A1* | 12/2013 | Kenzior | H04L 69/22 |
| | | | 709/231 |
| 2015/0213288 A1* | 7/2015 | Bilodeau | G06F 21/552 |
| | | | 726/26 |
| 2015/0379510 A1* | 12/2015 | Smith | G06Q 20/3829 |
| | | | 705/71 |
| 2016/0063645 A1* | 3/2016 | Houseworth | G06Q 50/265 |
| | | | 705/31 |
| 2017/0097835 A1* | 4/2017 | Tzen | G06F 9/4484 |
| 2017/0270526 A1* | 9/2017 | Fitzgerald | G06Q 40/123 |
| 2017/0286717 A1* | 10/2017 | Khi | G06F 21/6245 |
| 2018/0218168 A1* | 8/2018 | Goel | H04L 9/0643 |
| 2018/0337778 A1* | 11/2018 | Scheiblauer | G06F 21/6254 |
| 2019/0166101 A1* | 5/2019 | Ramos | H04L 9/0827 |
| 2019/0205886 A1* | 7/2019 | Ramakrishnan | G06Q 20/10 |
| 2020/0092287 A1* | 3/2020 | Cano | H04L 63/083 |
| 2020/0311299 A1* | 10/2020 | Amar | H04L 9/3213 |

\* cited by examiner

400

SYNTHETIC IDENTIFICATION PROTOCOL APPARATUS AND METHOD

RELATED APPLICATION(S)

This application claims the benefit of U.S. Provisional application No. 62/666,598, filed May 3, 2018, which is incorporated by reference in its entirety herein.

This application claims the benefit of U.S. Provisional application No. 62/676,217, filed May 24, 2018, which is incorporated by reference in its entirety herein.

This application claims the benefit of U.S. Provisional application No. 62/682,086, filed Jun. 7, 2018, which is incorporated by reference in its entirety herein.

TECHNICAL FIELD

These teachings relate generally to identification-based protocols.

BACKGROUND

Online storage facilities are often employed to store information provided by or that otherwise corresponds to particular entities such as individuals and businesses. Various security measures are often employed to attempt to preserve the veracity of and to otherwise protect the confidentiality of such information and privacy of the entities so represented. Unfortunately, security breaches can and do occur. In many typical prior art approaches, once an unauthorized person gains access to the stored information, the proverbial horse is out of the barn and accessed information can be correlated to the corresponding entities.

BRIEF DESCRIPTION OF THE DRAWINGS

The above needs are at least partially met through provision of the synthetic identification protocol apparatus and method described in the following detailed description, particularly when studied in conjunction with the drawings, wherein.

Figure 1:
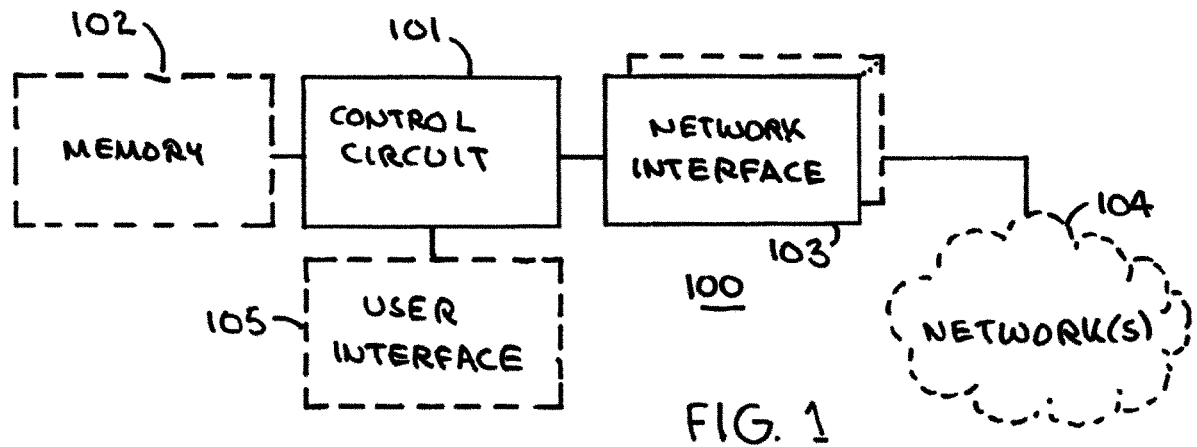
FIG. 1 comprises a block diagram as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated.

DETAILED DESCRIPTION

Generally speaking, pursuant to these various embodiments a control circuit receives personally identifiable information that corresponds to a particular entity. The control circuit uses that personally identifiable information to access a block chain ledger that serves as an identity block chain ledger. The control circuit then receives a synthetic identifier from the block chain ledger. This synthetic identifier correlates to the aforementioned personally identifiable information and also correlates to other data that corresponds to the particular entity and which other data is stored in a data storage element other than the block chain ledger.

So configured, and by one approach, a requesting entity provides the personally identifiable information to the control circuit which then provides that personally identifiable information to the block chain ledger to thereby receive, in turn, the corresponding synthetic identifier. The control circuit can then provide that synthetic identifier to the requesting entity. The requesting entity can use that synthetic identifier to access the aforementioned data storage element to thereby retrieve the aforementioned other data.

The personally identifiable information can include data that corresponds to the aforementioned particular entity other than in context with respect to the synthetic identifier. Useful examples include, but are not limited to, a person's or company's name, a taxpayer number, a Social Security number, a date of birth, a passport number, a military identification number, a physical mailing address, and so forth. As one illustrative non-limiting example, a required format for personally identifiable information for an entity that is a person within the United States could be "first_name, last_name, social_security_number, date_of_birth."

The aforementioned synthetic identifier, by way of contrast, serves specifically and only to correlate the particular entity to the aforementioned other data. With this in mind, the aforementioned block chain ledger, when serving as an identity block chain ledger, may, by one approach, only serve to correlate personally identifiable information with corresponding synthetic identifiers to thereby respond appropriately to personally identifiable information queries (in addition to possibly also serving to generate or otherwise assign synthetic identifiers to such personally identifiable information).

By one approach, the synthetic identifier correlated to a specific plurality of items of personally identifiable information is generated through a computation of choice performed on the aforementioned block chain ledger.

The aforementioned personally identifiable information and/or synthetic identifier can be transmitted wholly in the clear or, in the alternative, may be transmitted partially or wholly as non-clear information. Non-clear information will be understood to refer to information that has been processed in order to provide privacy-based security that renders the information unintelligible to unauthorized persons who lack other information (such as a decryption key) required to render the information intelligible. As one non-limiting example, this can comprise rendering the information unintelligible in such a way that no information other than the clear information used to generate the non-clear information can be used to statistically or computationally infer any elements of the clear information, but through such a process that any two distinct values of non-clear information are consistently processed into two distinct values of non-clear information. Examples include but are not limited to encryption and collision-resistant cryptographic hash functions.

So configured, both veracity and privacy regarding the connection between specific entities and other information can be reliably guarded and preserved while still offering relatively convenient access to authorized entities having need of such information.

So configured, two distinct particular entities will be distinguishable by their synthetic identifiers without introducing the risk of assigning the same synthetic identifier to multiple entities.

These and other benefits may become clearer upon making a thorough review and study of the following detailed description. Referring now to the drawings, and in particular to FIG. 1, an illustrative apparatus that is compatible with many of these teachings will now be presented.

FIG. 1 presents an illustrative example of an identity locator 100. This identity locator 100 includes a control circuit 101. Being a "circuit," the control circuit 101 therefore comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 101 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 101 is configured (for example, by using corresponding programming as will be well understood by those skilled in the art) to carry out one or more of the steps, actions, and/or functions described herein.

By one optional approach the control circuit 101 operably couples to a memory 102. This memory 102 may be integral to the control circuit 101 or can be physically discrete (in whole or in part) from the control circuit 101 as desired. This memory 102 can also be local with respect to the control circuit 101 (where, for example, both share a common circuit board, chassis, power supply, and/or housing) or can be partially or wholly remote with respect to the control circuit 101 (where, for example, the memory 102 is physically located in another facility, metropolitan area, or even country as compared to the control circuit 101).

In addition to the relevant information content described herein, this memory 102 can serve, for example, to non-transitorily store the computer instructions that, when executed by the control circuit 101, cause the control circuit 101 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as a dynamic random access memory (DRAM).)

In this example the control circuit 101 operably couples to one or more network interfaces 103 that provide access to one or more network elements external to the identity locator 100. Numerous examples of network interfaces are known in the art. A non-exhaustive listing would include Universal Serial Bus (USB)-based interfaces, RS232-based interfaces, I.E.E.E. 1394 (aka Firewire)-based interfaces, Ethernet-based interfaces, any of a variety of so-called Wi-Fi™-based wireless interfaces, Bluetooth™-based wireless interfaces, cellular telephony-based wireless interfaces, Near Field Communications (NFC)-based wireless interfaces, standard telephone landline-based interfaces, cable modem-based interfaces, and digital subscriber line (DSL)-based interfaces. Such interfaces can be selectively employed to communicatively couple the identity locator 100 to another such machine, to a local area network, or to any of a variety of networks 104 including wide area networks or extranets (such as, but not limited to, the Internet). So configured the control circuit 101 can communicate with other elements (both within the identity locator 100 and external thereto) via the network interface 103. Network interfaces, including both wireless and non-wireless platforms, are well understood in the art and require no particular elaboration here.

By one optional approach the control circuit 101 also operably couples to a user interface 105. This user interface 105 can comprise any of a variety of user-input mechanisms (such as, but not limited to, keyboards and keypads, cursor-control devices, touch-sensitive displays, speech-recognition interfaces, gesture-recognition interfaces, and so forth) and/or user-output mechanisms (such as, but not limited to, visual displays, audio transducers, printers, and so forth) to facilitate receiving information and/or instructions from a user and/or providing information to a user. Such a user interface 105 can be helpful, for example, to properly configure, maintain, and/or operate the identity locator 100.

Figure 2:
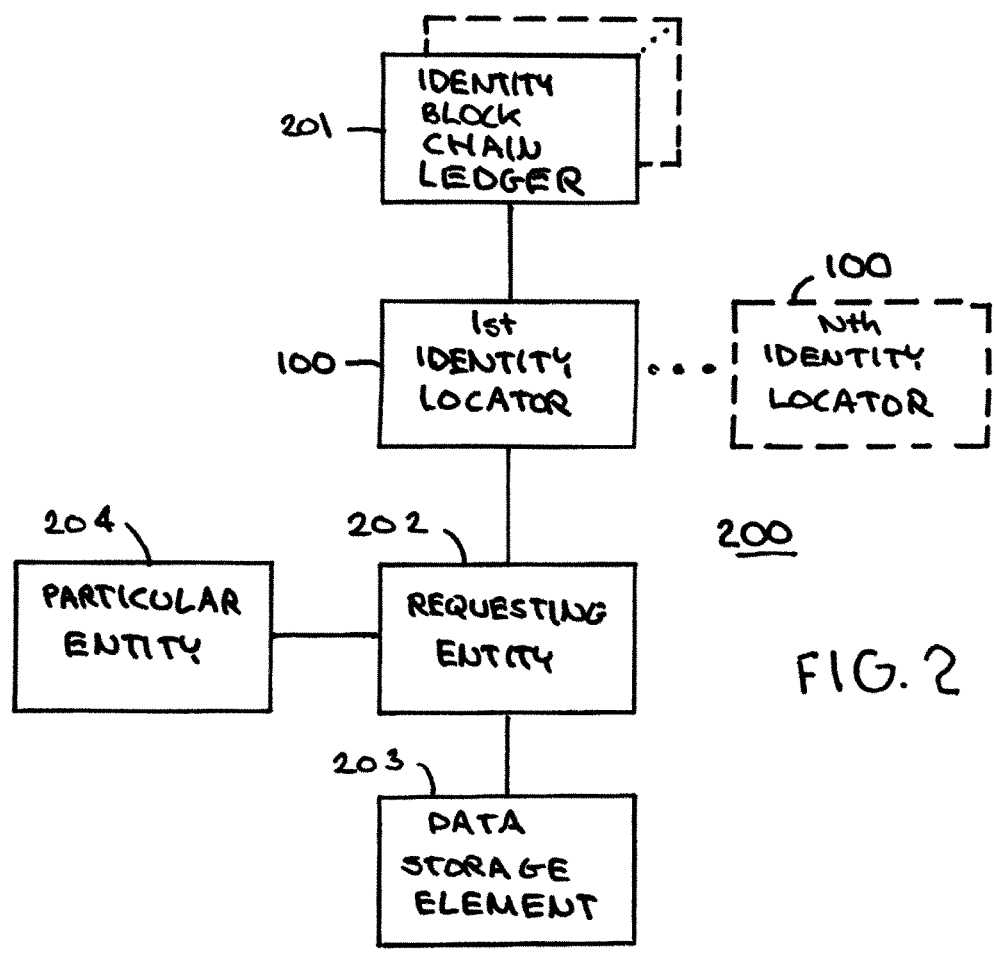
FIG. 2 comprises a block diagram as configured in accordance with various embodiments of these teachings.

FIG. 2 presents an illustrative application setting 200. It will be understood that the specific details provided in these regards are intended to serve an illustrative purpose and are not necessarily intended to suggest any limitations with respect to these teachings.

In this example the aforementioned identity locator 100 may comprise, if desired, one of a plurality of identity locators 100. There may be, for example, a first through an Nth identity locator 100 (where uppercase and comprises an integer greater than 1).

At least one of the identity locators 100 operably couples to at least one identity block chain ledger 201. By one approach, there can be a plurality of such block chain ledgers where each of the block chain ledgers 201 is specific to a corresponding region (such as a particular geographic region, a political region, or an economic region). The block chain ledger 201 can comprise a public or private ledger as desired. Generally speaking, block chain ledgers are, in and of themselves, well understood in the art and do not require further elaboration here.

By one approach, the collection of identity locators 100 is partitioned such that each sub-collection within the partition may only interact with a block chain ledger which is specific to a corresponding region. So configured, elements of personally identifiable information and synthetic identifiers can be reliably separated so as to quarantine the possibility of an (authorized or unauthorized) person compromising the information to one region.

This (or these) identity block chain ledger 201 stores information that correlates various items comprising personally identifiable information to corresponding synthetic identifiers. In a typical application setting, a single synthetic identifier will correlate to a plurality of different items of personally identifiable information that may all themselves correlate to only a single particular entity. For example, a given synthetic identifier may correlate to both a Social Security number and a passport number, but, in the absence of error, that synthetic identifier will only correlate to one particular entity (i.e., a particular person who has been assigned both that Social Security number and that passport number). By one approach these synthetic identifiers serve as a bridge that tethers the conceptualization of identifiers from other modalities (such as government issued identifiers, corporate identifiers, self-sovereign identifiers, and so forth) to a synthetic identity.

By one approach, the identity block chain ledger 201 is operated by one or more of the plurality of identity locators 100 (which is to say, an enterprise that owns and/or otherwise controls that identity locator).

By one approach the synthetic identifier is not derived from nor otherwise based in any way on the personally identifiable information for a particular entity. Instead, the only intentional and process-based connection/relationship between such datum and a given synthetic identifier is the mapped relationship therebetween. For example, a synthetic identifier can be assigned by simply randomly generating a one hundred-character alphanumeric string (after confirming that the resultant string has not already been assigned). The specific contents of such a string are not and cannot be derived from the contents of the corresponding personally identifiable information nor is the reverse possible.

By one approach, a given synthetic identifier may correlate to any one of a plurality of personally identifiable information items. By another approach, it may be required that a given synthetic identifier be accessible only upon presenting two or more items of personally identifiable information that all correlate to a particular given entity. By yet another approach, it can be required that a given synthetic identifier is only accessible upon presenting a specific plurality of specific items of personally identifiable information, such that a failure to present all of the specifically required items will be insufficient to access a synthetic identifier. In any event, a given synthetic identifier may not be accessible upon presentation of only one item of personally identifiable information even when the latter is correct and appropriate.

For the sake of an illustrative example, and without intending to suggest any particular limitations in these regards, a synthetic identifier can be formulated and assigned for a particular entity as follows.

First, the personally identifiable information (PII) of the particular entity is converted to a canonical format $id_{raw}$ and the PII hash is calculated as $h_u = H(id_{raw})$, where H is a cryptographically secure hash function such as SHA256.

Second, $h_D$ is truncated as the first D digits of $h_u$, where D is a defined parameter for K-anonymization (where the K in K-anonymization refers to the expected fraction of results returned by the query; for example, if D=10 then $K=2^{10}=1/1024$.

Next, one selects arbitrary m identity locators 100 that serve the particular identity Block chain ledger 201 of interest. One then sends a Locate Synthetic Identifier request to the selected m identity block chain ledgers 201 with $h_k$ as the payload.

In this example, each recipient identity locator 100 that receives the aforementioned request then responsively does the following the following:

Queries its database for all entries where the PII Hash begins with $h_k$;

Where the query returns n records, the query will be data of the form $\{h^1$: synthetic identifer$^1$,

. . . , $h^n$: synthetic identifier$^n\}$;

Prepare a response by encrypting all instances of h and synthetic identifer using the AES256e function with the PII hashes themselves as the key such that the response looks like:

$\{AES256e(h^1, h^1), AES256e(\text{synthetic identifier}^1, h^1)$

. . . , $AES256e(h^n, h^n): AES256e(\text{synthetic identifer}^n, h^n)\}$

The foregoing response can then be returned to the instigating party.

For each h in the response as received from each identity locator 100, the relevant party can decrypt each $h^x$ in the response using the AES256d(secret, key) function with the original PII hash $h_u$ (as was earlier created) as the secret and comparing the plaintext value to h. (If no $h_u$ is found after decrypting all instances of $h^x$, it means that no synthetic identifier has been created for this entity. A specific set of steps outlined below can then be employed to create a new synthetic identifier.)

Only one hash $h^x$ will decrypt such that the plaintext result is equal to the original PII hash $h_u$ and the synthetic identifier being sought will be the synthetic identifier$^x$ associated with $h^x$.

By one approach, when using a plurality of identity block chain ledgers 201, different synthetic identifiers as presented to different identity block chain ledgers 201 can be returned when presented with the same personally identifiable information. This approach can facilitate parsing other data for a particular entity 204 in various ways, with the individual segregated units of other data being accessed via different corresponding synthetic identifiers. As one simple example, all medical information for a particular entity 204 may be associated with a first synthetic identifier while all financial information for that same particular entity 204 is associated with a second, different synthetic identifier. Accordingly, to accommodate such an approach, a first one of the identity block chain ledgers 201 can represent medical information use cases while a second one of the identity block chain ledgers 201 can represent financial information use cases.

By one approach, the identity locator 100 and the identity block chain ledger 201 may have a preestablished relationship with one another to permit and facilitate the communications described herein. By another approach, in lieu of the foregoing or in combination therewith, the identity locator 100 and the identity block chain ledger 201 may utilize a unique and possibly confidential or otherwise secured communications protocol to facilitate the exchange of information as described herein.

In this illustrative example the identity locator 100 also operably couples (via, for example, the above-described network interface 103) to at least one requesting entity 202. (In a typical application setting the identity locator 100 may be accessible by any of a large plurality of requesting entities 202. For the sake of clarity and a simple example, only one requesting entity 202 appears in this example.)

The requesting entity 202, in turn, operably couples to one or more data storage elements 203. Each such data storage element 203 stores data comprising other data corresponds to synthetic identifiers for corresponding particular entities. This other data may constitute, for example, further metadata regarding the particular entity including but not limited to financial information, life experience information, metadata stemming from corporate processes (such as in anti-fraud measures or device verification), and facts or opinions regarding which the particular entity can attest, to note but a few examples in these regards.

By one approach, if desired, the data storage element 203 can itself constitute a block chain ledger. Again, in such a case, the B block chain ledger can constitute a public or private block chain ledger as desired.

Generally speaking, the data storage element 203 is configured to receive a synthetic identifier (for example, as provided by the requesting entity 202) and to employ that synthetic identifier to access and identify other data that correlates to that synthetic identifier. The data storage element 203 can then be further configured to provide some or all of the foregoing other data in response to a network element that proffers that synthetic identifier. The other data, when and so provided, can be provided as clear information or, if desired, as non-clear information (in whole or in part).

Also in this illustrative example, the requesting entity 202 operably couples to a particular entity 204. This particular entity 204 can constitute an individual person, a company, a governmental agency, an educational institution, and so forth as desired. In this example, it is this particular entity 204 that provides personally identifiable information regarding itself to the requesting entity 202. By one approach, the particular entity 204 provides self-selected items of personally identifiable information. By another approach, in lieu of the foregoing or in combination therewith, the particular entity 204 provides one or more items of personally identifiable information that are specifically requested or otherwise required by the requesting entity 202. (The personally identifiable information can be provided to the requesting entity 202 using any of a variety of input/transmission mechanisms and or methodologies. As the present teachings are not overly sensitive to any particular choices in these regards, further elaboration in these regards is not provided here for the sake of brevity.)

Figure 3:
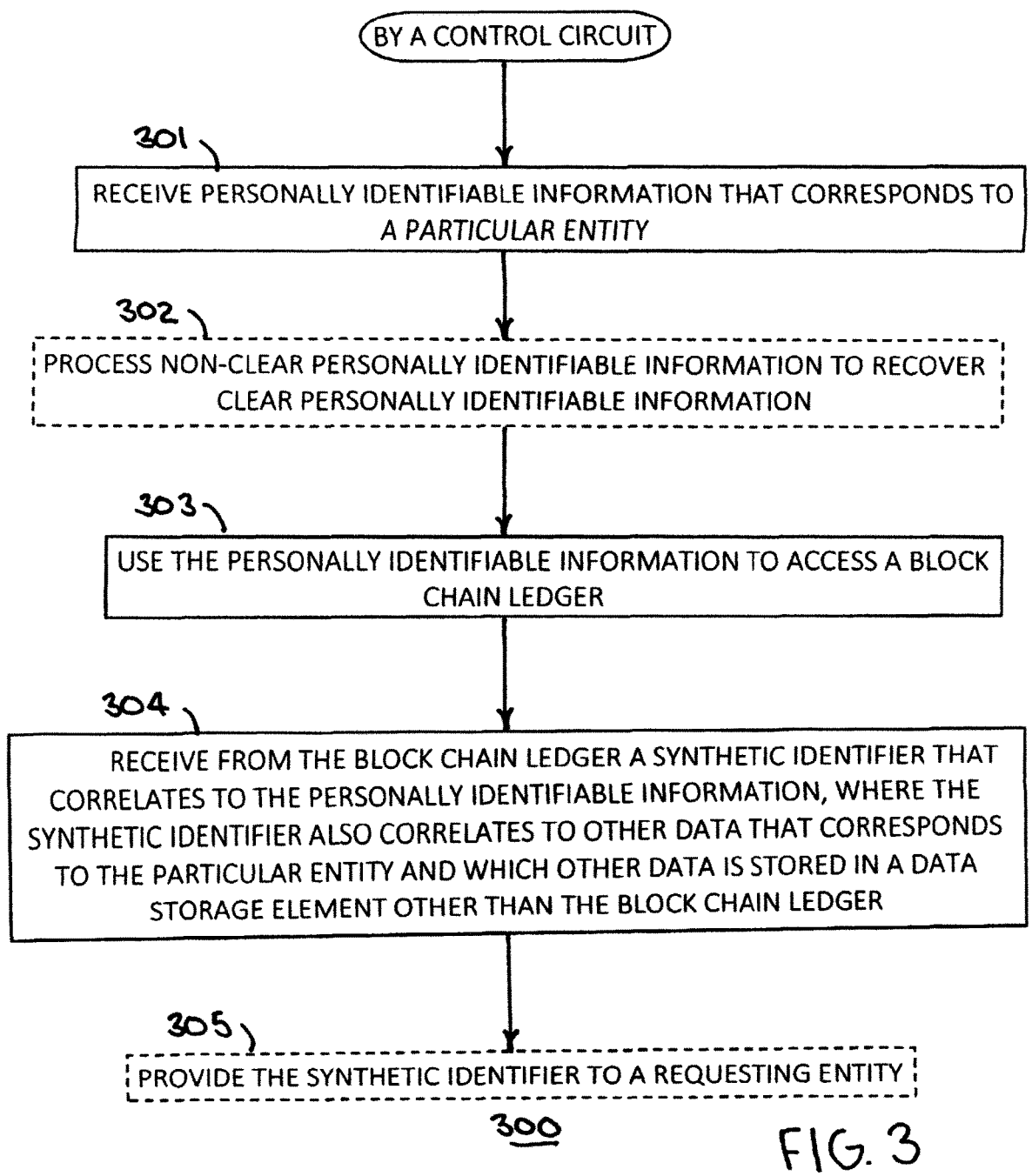
FIG. 3 comprises a flow diagram as configured in accordance with various embodiments of these teachings.

FIG. 3 presents a process 300 that can be utilized in the application setting 200 described in FIG. 2 as well as other application settings. This illustrative example presumes that a control circuit of choice (such as the above-described control circuit 101 of the identity locator 100) carries out the steps, activities, and functionality of this process 300.

At block 301 the control circuit 101 receives personally identifiable information that corresponds to a particular entity 204. For the sake of an example it is presumed here that the particular entity 204 is a person and that the control circuit 101 received that personally identifiable information from a requesting entity 202. In a typical application setting the requesting entity 202 will be different and distinct from the particular entity 204 (though it is possible that it may be useful for the requesting entity 202 and the particular entity 204 to be one and the same for some use cases).

By one approach the personally identifiable information received by the control circuit 101 constitutes clear information (i.e., information that has not been encrypted via an encryption key nor information that has been processed via, for example, a cryptographic hash function; it will be understood by those skilled in the art that clear information may nevertheless be encoded or otherwise modified in order to better ensure reliable transmission and reception and/or to otherwise accommodate the specific parameters of the transmission protocol). By another approach the personally identifiable information received by the control circuit 101 constitutes non-clear information (i.e., information that has been encrypted via an encryption key and/or information that has been processed via, for example, a cryptographic hash function). When the control circuit 101 receives non-clear personally identifiable information, this process 300 can provide, as shown at optional block 302, for processing the non-clear personally identifiable information to recover clear personally identifiable information to thereby permit follow-on use of an intelligible version of the personally identifiable information.

At block 303 the control circuit 101 uses the personally identifiable information (either as originally received (clear or non-clear) or as partially or wholly processed (for example, to recover clear content from received non-clear content)) to access a block chain ledger such as the above-described identity block chain ledger 201. This can comprise, for example, transmitting the personally identifiable information to the identity block chain ledger 201 via the aforementioned network interface 103, possibly in combination with other information such as the identity or address of the requesting entity, an authorization code or digital signature, and so forth.

By one approach the control circuit 101 provides the personally identifiable information to the identity block chain ledger 201 in a discrete transmission that does not include other items of personally identifiable information. By another approach the control circuit 101 provides the personally identifiable information to the identity block chain ledger 201 in a batch transmission that includes personally identifiable information for a plurality of different corresponding particular entities 204.

By one approach, at block 304 the control circuit 101 then receives from the block chain ledger 201 a synthetic identifier that correlates to the personally identifiable information that the control circuit 101 provided to the block chain ledger 201. As noted above, this synthetic identifier was previously (i.e., prior to the aforementioned request being proffered by the control circuit 101) correlated with other data that corresponds to the particular entity that is stored elsewhere other than at the identity block chain ledger 201. This other data may be content authored/created by or otherwise provided by the particular entity. By another approach this other data may comprise, in whole or in part, content that was authored/created by or otherwise provided by an entity other than the particular entity (such as, but limited to, personal references, business associates, investigative agencies, credit reporting operations, academic institutions, or military services, to note but a few).

In many (though not necessarily all) application settings, and as provided at block 305, the control circuit 101 can then provide the aforementioned synthetic identifier to, for example, a corresponding requesting entity 202. Such information can be provided in a clear or non-clear manner as desired.

Figure 4:
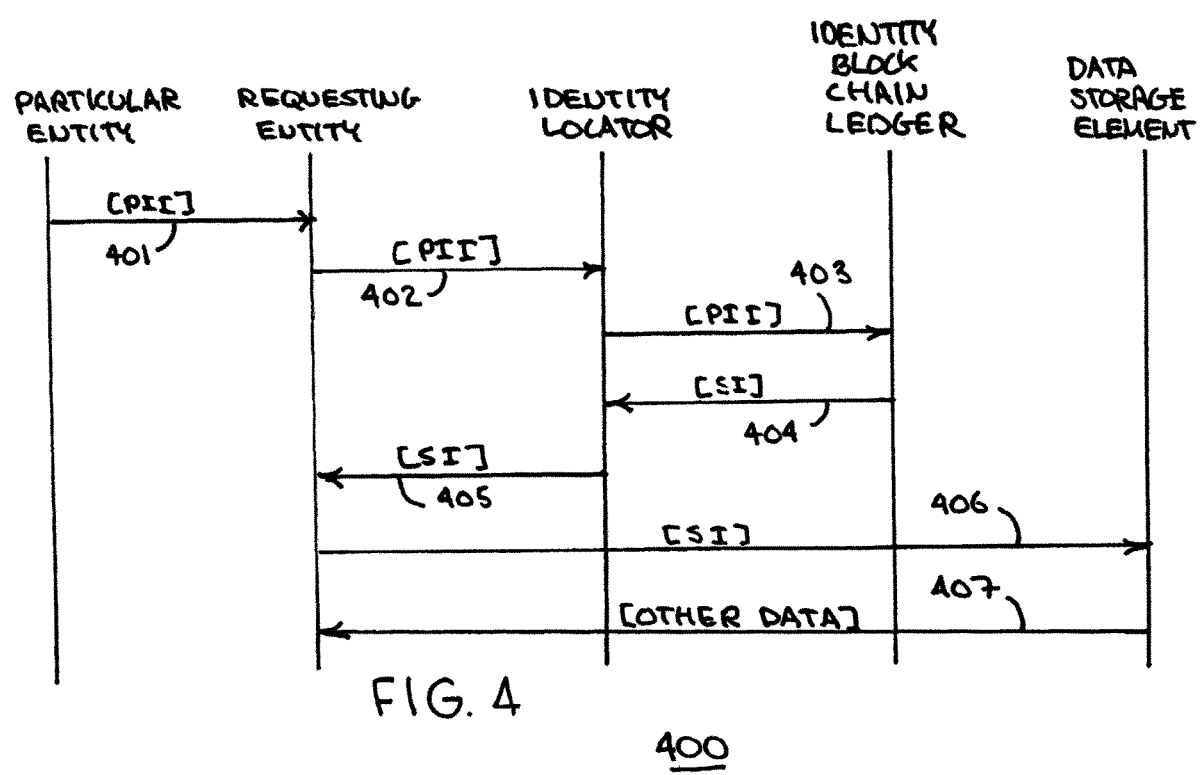
FIG. 4 comprises a signal flow diagram as configured in accordance with various embodiments of these teachings.

FIG. 4 presents an exemplary sequence of actions in the foregoing regards. With continuing reference to FIG. 2 as well, in this example a particular entity 204 transmits (at 401) personally identifiable information that correlates specifically and directly to the particular entity 204 to a requesting entity 202. The requesting entity 202 then transmits (at 402) that personally identifiable information to an identity locator 100. For the sake of this illustrative example, it is presumed here that the requesting entity 202 creates a canonical hash of the personally identifiable information and accordingly transmits that canonical hash to convey a representation of the personally identifiable information that is otherwise unintelligible to the identity locator 100.

The latter then transmits the personally identifiable information (at 403) to an identity block chain ledger 201. After identifying the synthetic identifier that correlates to that personally identifiable information, the identity block chain ledger 201 transmits (at 404) the synthetic identifier to the identity locator 100. The identity locator 100 then transmits (at 405) the synthetic identifier to the requesting entity 202. The latter can then utilize the synthetic identifier in a transmission (at 406) to a data storage element 203 to request other data that correlates to the synthetic identifier (and hence which correlates to the particular entity 204). Upon retrieving this other data, the data storage element 203 then transmits (at 407) the other data to the requesting entity 202.

So configured, information about and/or provided by various specific entities can be stored with a high degree of confidentiality as well as veracity. Without understanding how the synthetic identifiers correlate to particular entities, an unauthorized access to the other data can yield no information that can be correlated back to the original entities themselves. While the other data might be accessed via some unauthorized breach, the other data cannot be connected to the corresponding entities to which the other data pertains and hence privacy and security is achieved. This holds true regardless of the computational capacity and wherewithal available to the unauthorized party.

Those skilled in the art will recognize that a wide variety of modifications, alterations, and combinations can be made with respect to the above described embodiments without departing from the scope of the invention. As one example in these regards, the aforementioned identity block chain ledger can be wholly privately maintained or can be controlled, monitored, and/or regulated by a regulatory agency, governing body, industry group, consortium, or otherwise as desired. Accordingly, it will be understood that such modifications, alterations, and combinations are to be viewed as being within the ambit of the inventive concept.

What is claimed is:

1. A method comprising:
by a control circuit:
receiving a hash of personally identifiable information that corresponds to a particular entity;
truncating the hash of personally identifiable information to provide a truncated hash of personally identifiable information;
using the truncated hash of personally identifiable information to access a block chain ledger;
receiving from the block chain ledger at least one encryption value comprised of encrypted data that results from encrypting data that includes a synthetic identifier that correlates to the personally identifiable information and that also correlates to other data that corresponds to the particular entity where the other data is stored in a data storage element other than the block chain ledger; and
using the hash of the personally identifiable information as a symmetric key to decrypt at least one of the at least one encryption value in an attempt to retrieve the synthetic identifier, wherein no indication is provided by the truncated hash of personally identifiable information as to which, if any, of the at least one encryption value is decrypted by the control circuit to successfully recover the synthetic identifier.

2. The method of claim 1 wherein the personally identifiable information includes data that corresponds to the particular entity other than in context with respect to the synthetic identifier.

3. The method of claim 2 wherein the personally identifiable information that corresponds to the particular entity comprises at least one of a name, a taxpayer number, a social security number, a date of birth, a passport number, a military identification number, and a physical mailing address.

4. The method of claim 1 wherein receiving the hash of personally identifiable information comprises at least one of:
receiving a clear hash of personally identifiable information; and
receiving a non-clear hash of personally identifiable information.

5. The method of claim 1 wherein receiving the hash of personally identifiable information comprises receiving a non-clear hash of personally identifiable information, the method further comprising:
processing the non-clear hash of personally identifiable information to recover a clear hash of personally identifiable information.

6. The method of claim 1 wherein the block chain ledger is specific to a corresponding region.

7. The method of claim 6 wherein the corresponding region comprises at least one of a geographic region, a political region, and an economic region.

8. The method of claim 1, wherein:
receiving the hash of personally identifiable information comprises receiving the hash of personally identifiable information from a requesting entity; and
wherein the method further comprises:
providing the synthetic identifier to the requesting entity.

9. The method of claim 8 wherein the requesting entity is different from the particular entity.

10. The method of claim 1 wherein the synthetic identifier specifically and only serves to correlate the particular entity to the other data.

11. The method of claim 1 wherein the block chain ledger only serves to correlate personally identifiable information with corresponding synthetic identifiers.

12. An apparatus comprising:
a network interface;
a control circuit operably coupled to the network interface and configured to:
receive, via the network interface, a hash of personally identifiable information that corresponds to a particular entity;
truncating the hash of personally identifiable information to provide a truncated hash of personally identifiable information;
use the truncated hash of personally identifiable information to access a block chain ledger via the network interface;
receive, via the network interface and from the block chain ledger, at least one encryption value comprised of encrypted data that results from encrypting data that includes a synthetic identifier that correlates to the personally identifiable information and that also correlates to other data that corresponds to the particular entity and which other data is stored in a data storage element other than the block chain ledger; and
using the hash of the personally identifiable information as a symmetric key to decrypt at least one of the at least one encryption value in an attempt to retrieve the synthetic identifier, wherein no indication is provided by the truncated hash of personally identifiable information as to which, if any, of the at least one encryption value is decrypted by the control circuit to successfully recover the synthetic identifier.

13. The apparatus of claim 12 wherein the personally identifiable information includes life-event information for the particular entity comprising at least one of a name, a taxpayer number, a social security number, a date of birth, a passport number, a military identification number, and a physical mailing address.

14. The apparatus of claim 12 wherein the control circuit is configured to receive the hash of personally identifiable information by at least one of:
   receiving a clear hash of personally identifiable information; and
   receiving a non-clear hash of personally identifiable information.

15. The apparatus of claim 12 wherein the control circuit is configured to receive the hash of personally identifiable information by receiving a non-clear hash of personally identifiable information, and wherein the control circuit is configured to:
   process the non-clear hash of personally identifiable information to recover the personally identifiable information.

16. The apparatus of claim 12 wherein block chain ledger is specific to a corresponding region.

17. The apparatus of claim 16 wherein the corresponding region comprises at least one of a geographic region, a political region, and an economic region.

18. The apparatus of claim 12 wherein the control circuit is further configured to:
   provide the synthetic identifier to a requesting entity.

19. The apparatus of claim 18 wherein the requesting entity is different from the particular entity.

20. The apparatus of claim 12 wherein the synthetic identifier specifically and only serves to correlate the particular entity to the other data.

* * * * *